United States Patent [19]
Rively et al.

[11] 3,729,787
[45] May 1, 1973

[54] METHOD AND APPARATUS FOR MANUFACTURING BEADED FILAMENT-COIL COMPONENTS FOR ELECTRIC LAMPS

[75] Inventors: Clair M. Rively, Old Bridge; James Petro, Little Falls, both of N.J.

[73] Assignee: Westinghouse Electric Corporation, Pittsburgh, Pa.

[22] Filed: Sept. 22, 1971

[21] Appl. No.: 182,581

[52] U.S. Cl. ............... 29/25.18, 29/25.13, 29/423, 313/344
[51] Int. Cl. ............................................. H01j 9/00
[58] Field of Search ............... 313/341, 344, 345; 29/25.13, 25.14, 25.15, 25.17, 25.18, 25.19, 25.2, 423; 140/71.5

[56] References Cited

UNITED STATES PATENTS

| | | | |
|---|---|---|---|
| 2,067,746 | 1/1937 | Zabel | 29/25.18 X |
| 2,359,302 | 10/1944 | Curtis | 29/25.15 |
| 2,687,489 | 8/1954 | Anderson et al. | 29/25.14 X |
| 3,110,098 | 11/1963 | Sobierajski | 29/25.18 X |

Primary Examiner—Charles W. Lanham
Assistant Examiner—J. W. Davie
Attorney—A. T. Stratton, et al.

[57] ABSTRACT

The ends of helically-coiled lamp filaments are provided with integral nodules or beads of fused metal which prevent the finished coils from tangling when handled en masse. The beads are formed by mechanically cutting the mandrel-coil composite (stock wire) into segments of uniform length, feeding the segments into a notched circular conveyor means, and indexing the conveyor means relative to a pair of stationary torches so that the flames from the latter melt the ends of the stock wire segments in situ and form the desired nodules of molten metal which then solidify. The unmelted portions of the mandrel are subsequently chemically dissolved from the stock wire segments in the usual fashion — thus providing hollow filament coils of refractory wire that have a fused metal bead at each end.

13 Claims, 8 Drawing Figures

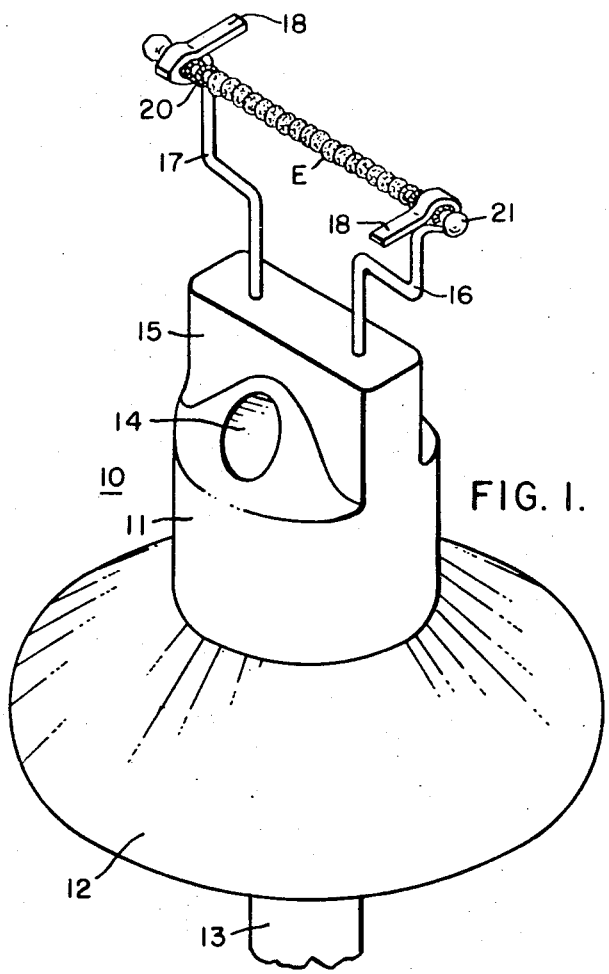
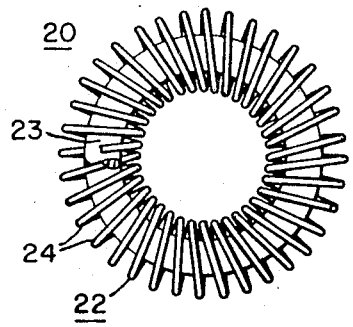
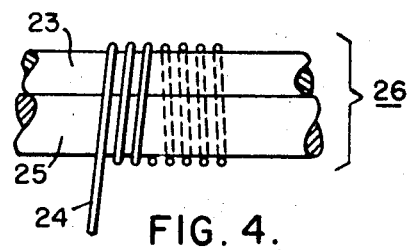
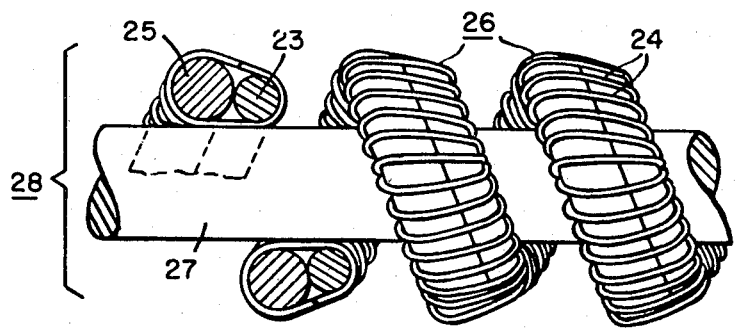
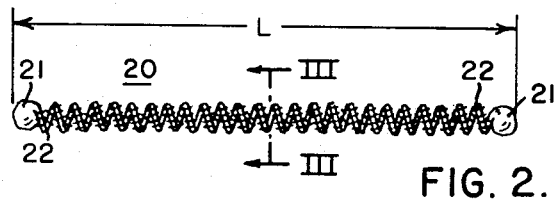

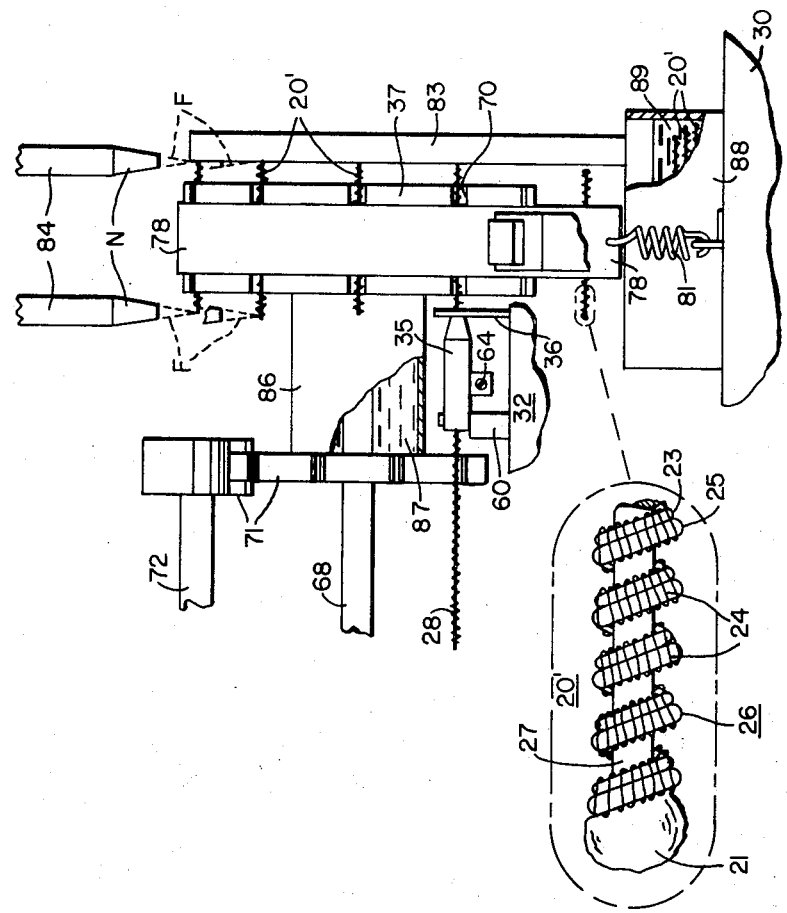
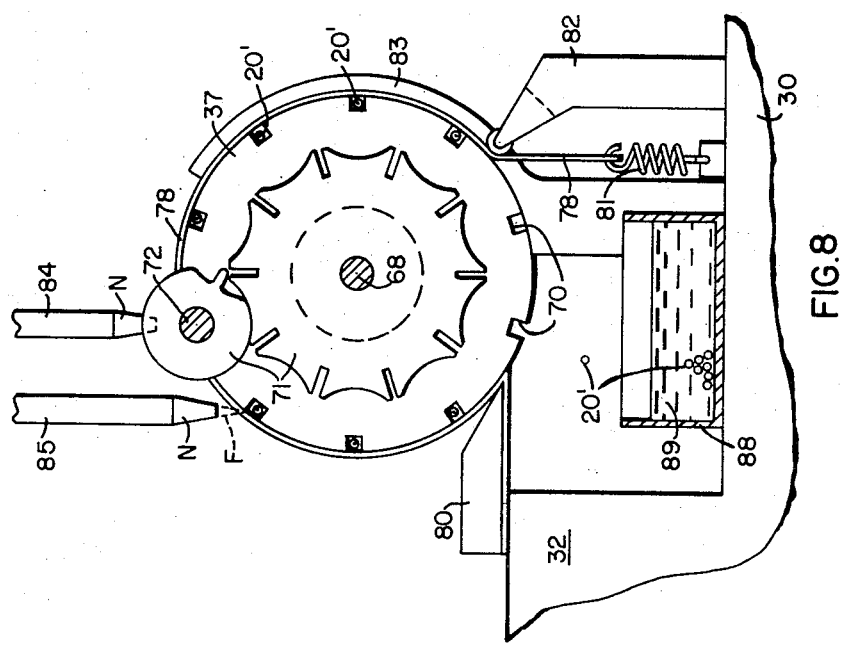
FIG. 7
FIG. 8

3,729,787

METHOD AND APPARATUS FOR MANUFACTURING BEADED FILAMENT-COIL COMPONENTS FOR ELECTRIC LAMPS

CROSS-REFERENCE TO RELATED APPLICATIONS

The subject matter of this application constitutes an improvement over that disclosed and claimed by the same inventors in their pending applications Ser. No. 792,988 filed Jan. 22, 1969, and Ser. No. 163,651 filed July 19, 1971, which applications are assigned to the same assignee as the present application.

BACKGROUND OF THE INVENTION

1. Field of the Invention

The present invention relates to the manufacture of coiled articles, such as filament coils for electric lamps, and has particular reference to an improved method and apparatus for making refractory wire coils which are adapted for use as fluorescent lamp cathodes and can be handled and shipped en masse without becoming tangled.

2. Description of the Prior Art:

As is well known, filament coils for fluorescent and incandescent lamps are manufactured by winding a tungsten wire on a mandrel of dissimilar metal, (such as iron), cutting the resulting composite wire into segments of the proper length, and then chemically dissolving the mandrel from the segments to provide the desired individual hollow coils of tungsten wire.

In the case of so-called "barrelless" electrode coils that are used as cathodes in fluorescent lamps, the coil consists of a tungsten core wire that has been wound into a helix and has a loose overwinding of fine tungsten wire which forms a basket-like structure for the electron-emission material. Since the tungsten core wire is of small diameter, a burr is formed when it is mechanically cut during the coil manufacturing operation. Experience has shown that these burred ends have a natural tendency to protrude from the ends of the loose overwinding of fine wire, thus permitting them to snag and become interlocked with the turns of other coils when the finished coils are placed in a container or hopper and are allowed to contact one another at random. In the extreme, the tangling becomes so complete that it is possible to lift the entire contents of a container that holds hundreds of coils simply by gripping and pulling one end of a single coil.

As a result of the aforesaid tangling problem, it has been extremely difficult to design a satisfactory coil feeder which will automatically and reliably separate the coils and supply individual coils to a mounting machine. The prior art coils were, accordingly, manually separated and fed by hand into the mounting machine. This operation is not only time-consuming and tedious but materially increases the manufacturing cost of the lamps. In addition, large quantities of finished coils frequently have to be scrapped during manufacture and inspection because it is literally impossible to untangle them. The percent shrinkage is thus very high and further increases the lamp manufacturing cost.

The aforementioned problems were solved by providing ductile nodules or beads of fused tungsten-iron alloy on the ends of the finished coils which render the coils tangle-proof and permit them to be processed and handled en masse without becoming interlocked one with another. The aforementioned pending applications of the present inventors disclose and claim such noduled filament coils, as well as various methods and an apparatus for making them using controllable concentrated head sources (such as an electron beam, a plasma torch, an oxy-hydrogen flame or a high-power laser) to melt the ends of the mandrel in situ and form the nodules during coil manufacture.

Subsequent experience has shown that while the use of a laser for this purpose was preferred as regards the ability to focus the laser beam onto the mandrel and melt it rapidly, this technique also had some disadvantages in that it entailed a high capital cost for equipment and sometime produced beads which were not uniform in size. In addition, the intense heating produced by the focused laser beam vaporized some of the material and occasionally caused part of the molten metal to drip away from the melting site and be lost. Such losses, of course, reduced the material efficiency of the operation and increased the unit cost of the finished coils.

SUMMARY OF THE INVENTION

The foregoing drawbacks are avoided in accordance with the present invention by mechanically cutting the stock wire into segments and then feeding the segments into a conveyor which carries them along an arcuate path through the flames of a pair of spaced stationary torches that melt both ends of the segments simultaneously and form the desired nodules of molten metal. The conveyor immediately drops the noduled segments of stock wire into a liquid bath, such as water — thus solidifying the nodules before any of the molten metal drips off and is lost. The resulting mebryonic filament-coil components are then dried and immersed in an acid bath which dissolves the mandrels and transforms the components into finished tungsten coils having an integral bead at each end.

The mechanical severing, conveying and flame-beading operations are synchronized by using coupled indexing mechanisms so that the manufacture of beaded filament-mandrel components from a continuous supply of stock wire is achieved efficiently at a high rate of speed. Up to 300 pieces per minute have been produced in this manner using two pairs of oxy-hydrogen torches for the beading operation. The beads on the finished filament coils are of uniform size and are formed with little or no loss of material during the heating operation.

BRIEF DESCRIPTION OF THE DRAWINGS

A better understanding of the invention will be obtained from the exemplary embodiment shown in the accompanying drawings, in which:

FIG. 1 is an enlarged perspective view of a mount assembly for a fluorescent lamp having a beaded electrode coil produced by the present invention;

FIG. 2 is a front elevational view of the beaded electrode coil before it is fastened to the lead wires of the mount and coated with emission material;

FIG. 3 is an enlarged cross-sectional view through the uncoated coil along the line III—III of FIG. 2;

FIG. 4 is an enlarged elevational view of a segment of the composite wire used in making the coil shown in the preceding figures;

FIG. 5 is an enlarged perspective view of a portion of the aforementioned composite wire after it has been wound around a mandrel to form a continuous stock wire;

FIG. 7 is an enlarged front elevational view of the cutting and beading portions of the machine, including an enlarged front elevational view of one end of a bead stock wire segment produced by the machine; and FIG. 8 is an enlarged side elevational view of the circular conveyor, its geneva-drive, and the bath of cooling liquid into which the hot beaded segments are dropped.

DESCRIPTION OF THE PREFERRED EMBODIMENT

Figure 6:
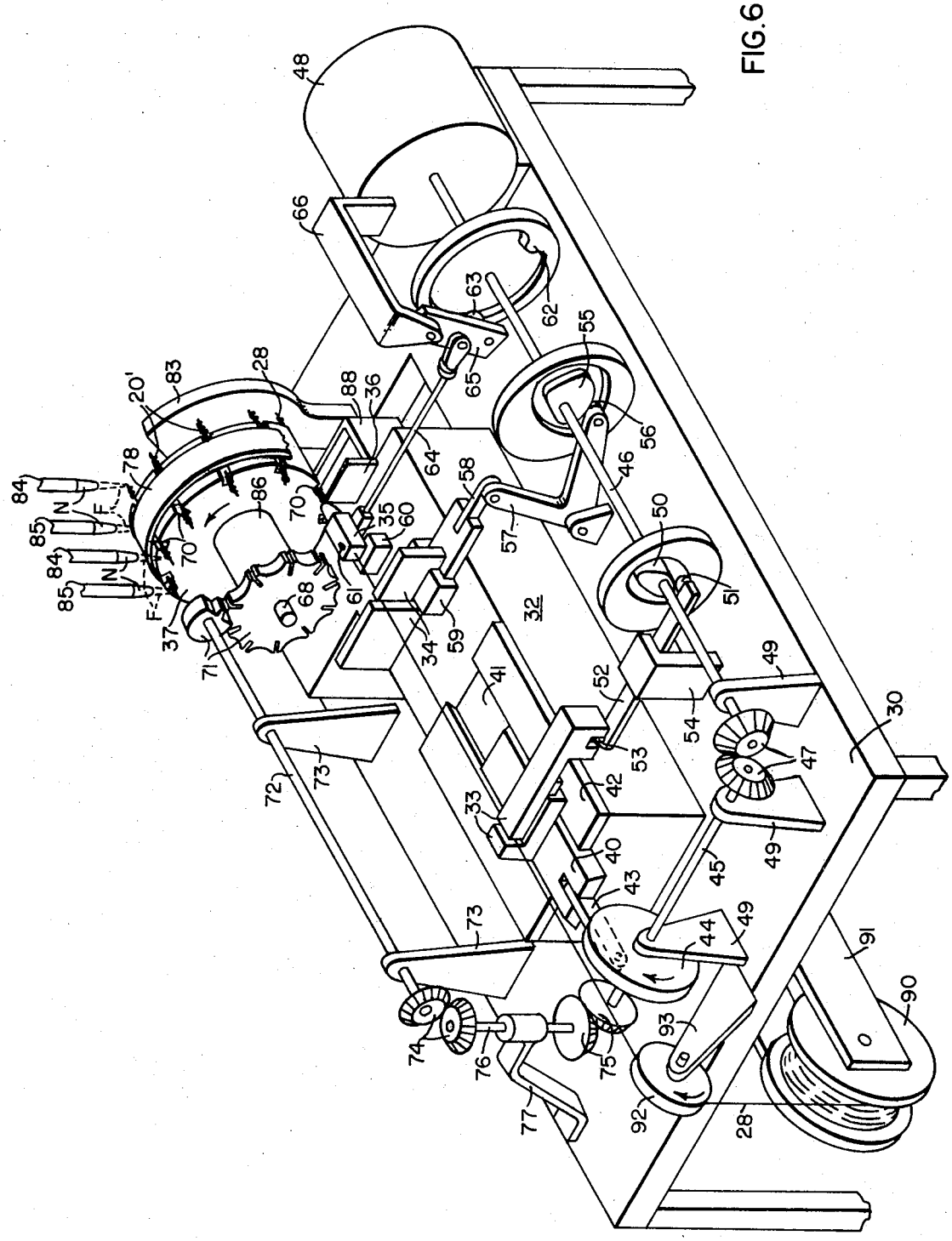
FIG. 6 is a perspective view of an apparatus for mechanically-severing and flame-beading the stock wire in a rapid synchronized manner in accordance with the present invention.

In FIG. 1 there is shown a mount assembly 10 of the type that is used in fluorescent lamps and thus includes the usual glass stem 11 that has a flare 12 at one end and a depending exhaust tube 13 which extends into the stem and communicates with an aperture 14 located below the stem press 15. A pair of lead wires 16, 17 are sealed through the press 15 and have their free ends clamped around the ends of a thermionic cathode that consists of a barrelless type electrode coil 20 of non-recrystallized tungsten wire that is coated with a suitable electron-emission material E, such as the well-known mixture of alkaline earth oxides.

As will be noted, each end of the coil 20 is provided with an integral nodule such as a generally globular bead 21 of ductile metal that extends across the end face of the coil. It will also be noted that the coating E of emission material extends over only the medial portion of the coil 20 so that the coil turns immediately adjacent the clamps 18 are left uncoated. Such coils are referred to in the art as "barrelless" coils because they consist of a plurality of spaced turns that are of the same diameter and thus from a helix that is of linear configuration and the same diameter throughout its length. Such barrelless coils, accordingly, do not have the enlarged secondary turns and medial coil-barrel portion characteristic of coiled-coil or triple-coiled filaments.

As shown more particularly in FIG. 2, the beads 21 terminate the end turns 22 of the coil 20 and are of approximately the same size as the coil diameter so that the coil has a predetermined overall length L. The beads thus merge with and close the ends of the hollow coil 20 . . . thereby providing a tangle-proof terminus at each end of the coil.

As illustrated in the enlarged cross-sectional view of the uncoated coil shown in FIG. 3, the coil 20 consists of a core wire 23 of suitable refractory material (such as non-recrystallized tungsten) which is wound into a helix and has a winding of fine refractory wire 24 (such as non-recrystallized tungsten) loosely coiled therearound. The turns of the fine wire 24 enclose the core wire 23 and form a "basket-like" structure or matrix which increases the emission-holding capacity of the coil 20. As depicted in FIG. 1, the emission material E fills the matrix formed by the loose overwinding of fine wire 24 and bridges the turns 22 of the coil 20.

Briefly, the electrode coil 20 is manufactured by pairing the tungsten core wire 23 with a slightly larger filler wire 25 of dissimilar metal, such as iron, that can be subsequently chemically dissolved from the wound coil without affecting the tungsten core wire. As shown in FIG. 4, the paired tungsten core wire 23 and iron filler wire 25 constitute a dual-strand core component around which the fine tungsten wire 24 is then tightly wound to form a composite wire 26. This composite wire 26 is, in turn, wound around an iron mandrel 27 at the required TPI to form a continuous coil-mandrel composite 28 shown in FIG. 5. For convenience, this composite 28 will be referred to in the description which follows and in the claims as the continuous "stock wire."

In the prior art, the stock wire 28 was mechanically cut into segments of the desired length and such segments were placed in an acid bath (hydrochloric acid, for example) which dissolved the iron filler wire 25 and iron mandrel 27 and thus produced hollow finished coils consisting of the coiled tungsten core wire 23 and its loose overwinding of fine tungsten wire 24. Since the core wire 23 is of small diameter (typically around 0.058 mm.), it is impossible as a practical matter to mechanically cut it cleanly. As a result, burrs were unavoidably left on the cut ends. Since the core wire 23 is only loosely enclosed by the fine wire winding 24, the burred ends of the core wire naturally protruded from the ends of the finished coils and created the aforementioned snagging and tangling problems when the coils were placed into a hopper and handled en masse. In accordance with the teachings of the aforementioned pending applications of the present inventors, this coil-tangling problem is solved by melting the ends of the iron mandrel 27 in situ and thereby forming an integral bead 21 of fused ductile tungsten-iron alloy at each end of the severed segments of stock wire 28. Since the acid subsequently used to dissolve the iron mandrel 27 and filler wire 25 does not attack tungsten, these tungsten-iron alloy beads 21 remain in place on the end turns 22 of the finished coils 20 (as shown in FIGS. 1 and 2) after the iron components have been removed.

When the iron mandrel 27 is melted, the resulting pool of molten iron dissolves the overlying tungsten portions of the composite wire 26 so that the ends of the core wire 23 and overwound fine wire 24 merge with and are anchored in the respective beads 21. The end turns of the finished hollow coils 20 are thus terminated by globular beads 21 that are substantially smooth and larger than the spacing between the coil turns 22, thereby completely eliminating the troublesome burred ends and tangling problems characteristic of the prior art coils.

The present invention specifically relates to an improved method and apparatus for manufacturing beaded segments of stock wire from a continuous supply of such wire, and these will now be described.

As shown in FIG. 6, the apparatus according to one embodiment consists of a table 30 having an elongated platform 32 that serves as a base for two pairs of clamping jaws 33 and 34, a guide nozzle 35, a cutting knife 36 and a suitable carrier such as a circular conveyor drum 37. The clamping jaws 33 are mounted on a carriage 40 that is reciprocally movable along a channel 41 in a block 42 that is secured to the platform 32. The carriage 40 is eccentrically coupled by a linking arm 43 to a driving wheel 44 that is rotated at a constant speed by a shaft 45 which, in turn, is driven by a main shaft 46 through a set of bevel gears 47. The main shaft 46 is coupled to an electric motor 48 that is fastened to one corner of the table 30. These shafts are supported and held in operative relationship with one another by brackets 49 that are secured to the table 30 and are provided with suitable bearings which permit the respective shafts to rotate freely.

The movable clamping jaw 33 is opened and closed by a cam 50 that is secured to the main drive shaft 46 and actuates a cam-follower 51 carried by a connecting rod 52 which is keyed to the end of the movable jaw 33 by a pin-and-slot arrangement 53. The connecting rod 52 is slidingly held in operative relation with the cam 50 and movable jaw 33 by a bracket 54 that is secured to the table 30. Clamping jaws 33 can thus be moved in reciprocal fashion along a prescribed path toward and away from the conveyor drum 37 and can be actuated at the beginning and end of each stroke of the carriage 40, as will be described.

The second pair of clamping jaws 34 is actuated by coupling the movable jaw to a second cam 55 through a cam-follower 56 fastened to one end of a V-shaped rocker arm 57 that is pivotally anchored to the table 30. Rocker arm 57 is coupled to a link pin 58 that is fastened to the movable jaw 34 and slides within a housing 59 secured to the platform 32.

Means for mechanically severing the stock wire 28 is provided between the second pair of clamping jaws 34 and the circular conveyor means 37 and, in the embodiment shown in FIG. 6, comprises a nozzle 35 whose tip is aligned with the cutting edge of the stationery knife 36. The nozzle 35 is pivotally mounted on the platform 32 by a support block 60 and a pin 61 and is swung toward and away from the knife 36 by a third cam 62 that is fastened to the main drive shaft 46 and is coupled to the nozzle by a cam-follower 63 and a tie rod 64 that is attached to the bottom of the nozzle. As shown, the cam-follower 63 is held in operative relationship with its cam 62 by a plate 65 that is anchored to the table 30 and has its opposite end secured to a bracket 66 attached to the housing of the motor 48.

As illustrated more particularly in FIGS. 6 and 7, the conveyor drum 37 is disposed in upstanding position adjacent the knife 36 with its peripheral surface in line with the tip of the nozzle 35 and is rotatably held in this position by a shaft 68 that is supported by suitable brackets (not shown) secured to the table 30 and platform 32. The conveyor 37 is provided with a series of parallel and equally spaced recesses or notches 70 that extend across the rim of the conveyor and are dimensioned and located to nestingly receive the end segments of the stock wire 28 that are fed through the nozzle 35 by the two sets of clamping jaws 33 and 34. The above-mentioned notches 70 are sequentially aligned with the opening of the nozzle 35 by indexing the conveyor 37 with a conventional geneva-drive 71 that is actuated by a drive shaft 72 that is rotatably supported by brackets 73 (see FIG. 6) and is coupled to drive shaft 45 by two sets of bevel gears 74, 75 and a connecting shaft 76 that is held in upstanding position by another bracket 77.

The conveyor 37 is provided with a stationary band 78 that extends around only part of the periphery of the conveyor and is secured to the table and kept taut by a block 80 and a spring 81 – strut 82 arrangement shown in FIG. 8. The band 78 is thus resiliently held against and in sliding relationship with the periphery of the conveyor drum 37 and thus serves as a means for retaining segments 20' of stock wire in the respective notches 70 without interfering with the indexed rotation of the conveyor.

A suitable guide member such as a flat plate 83 is also secured to the table 30 in upstanding position a predetermined distance from the end face of the circular conveyor 37 (see FIG. 7) to prevent axial displacement of the segments 20' of stock wire being carried in the notches 70, align them one with another and keep them in this relationship as they are advanced toward two sets of stationary torches 84 and 85 (see FIG. 8) located near the top and other side of the conveyor 37. As will be noted in FIG. 7, the nozzles N of these torches are disposed on opposite sides of the conveyor 37 and are directed toward points located just beyond the peripheral edges of the conveyor.

As shown in FIG. 8, the guide plate 83 is terminated short of the first set of torches 84 to prevent it from being struck by the hot flames. The geneva-gear system 71 is also protected from the intense heat by enclosing the portion of the shaft 68 that is located beneath the torches in a jacket 86 that is filled with a suitable liquid coolant such as water 87 (see FIG. 7). A suitable hopper 88 containing a liquid coolant such as water 89 (see FIGS. 7 and 8) is located on the table 30 beneath the conveyor 37 to collect and rapidly cool the hot beaded segments 20' of stock wire as they fall out of the conveyor.

Returning to FIG. 6, the continuous supply of stock wire 28 is wound on a spool 90 that is anchored to the bottom of the table 30 by a suitable bracket 91. The free end of the stock wire 28 is drawn over a pulley 92 that is located above the spool 90 and is rotatably held in this position by a support arm 93 which is fastened to the table 30. The stock wire 28 passes between the two sets of clamping jaws 33-34, through a suitable aperture in the guide nozzle 35, past the cutting edge of the knife 36, through the aligned notch 70 of the circular conveyor 37, and finally into abutting relationship with the guide plate 83.

As will be appreciated by those skilled in the art, the various cams, linkages and geneva-gear system are so correlated that the various sequence of operations which will now be described are synchronized and effect the indexing of the stock wire 28 and conveyor 37 in such a manner that the notches 70 of the conveyor are sequentially aligned with and receive the free end of the stock wire as the latter is fed through the machine.

The first step in the aforesaid sequence of operations comprises feeding the free end of the stock wire 28 through the aligned notch 70 of the conveyor 37 at the "loading" station until it strikes the guide plate 83. This is accomplished by the coordinated action of cams 50 and 55 and the reciprocating movement provided by the carriage 40 and driving wheel 44 which cause the clamping jaws 33 to grip the stock wire 28, jaws 34 to concurrently open, and carriage 40 to move the closed jaws 33 and clamped stock wire 28 as a unit so that the free end of the latter passes through the nozzle 35 and aligned conveyor notch 70 and stops immediately adjacent the guide plate 83.

At the end of the forward stroke of the carriage 40, clamping jaws 34 close and jaws 33 open, thus holding the stock wire 28 stationary as the carriage begins its return stroke and moves the jaws 33 to their original position. During the return stroke of the carriage 40, cam 62 and its tie rod 64 pivots the nozzle 35 and pulls it toward the knife 36 at the "cutting" station. This, in turn, forces the portion of the stock wire 28 located at the tip of the nozzle 35 against the cutting edge of the knife 36 — thus severing the wire. Immediately thereafter, the geneva-gear system 71 indexes the conveyor drum 37 one position and aligns an empty notch 70 with the nozzle 35 and the cut end of the stock wire 28. The foregoing series of operation is then repeated.

As the conveyor 37 is indexed, the severed segments 20' of the stock wire are advanced past the two sets of torches 84 and 85 so that the four sets of sharply-defined flames F impinge upon and melt the protruding ends of the wire segments causing them to melt and form molten beads 21 of metal at each end of the segments.

As will be noted in FIG. 7, the spacing between the outer face of the conveyor drum 37 and the inner face of the guide plate 83 is such that the ends of the respective stock wire segments 20' protrude substantially equal distances beyond the sides of the conveyor. Hence, the torches 84–85 only melt controlled and equal parts of the wire segments. The beads 21 are, accordingly, of uniform size and the beaded segments 20' of stock wire are also of substantially the same overall length.

As shown in FIG. 8, the retaining band 78 does not extend around the bottom portion of the conveyor 37 so that the beaded segments 20' of stock wire fall out of the conveyor as they are indexed into this position and drop into the pool of water 89 in the hopper 88. The beads of molten metal are thus rapidly cooled and solidified, thus preventing the collected beaded segments 20' from becoming "welded" to one another during the cooling process. The accidental loss of molten material by dripping etc. is also avoided by this technique.

As illustrated in the enlarged fragmentary view of one end of the beaded segments 20' produced by this method, the beads 21 of fused metal are smooth and globular and merge with the iron mandrel 27 and end turn of the coiled composite wire 26 formed by the tungsten core wire 23, the iron filler wire 25 and fine overwinding 24 of tungsten wire.

While excellent results have been obtained with oxygen-hydrogen type torches, any high-temperature and sharply-defined flame, such as that provided by well-known plasma torches, can be used, to effect the beading operation. More than two sets of torches can also be used to increase the production speed of the machine, in which case the additional sets of torches would be placed either immediately before or after the two sets of torches 84, 85 shown in the drawing.

We claim as our invention:

1. In the manufacture of helically-coiled filaments for electric lamps or the like, the method of providing a terminus at each end of the finished filament coils which inhibits the tendency of such coils to interlock with one another and become entangled when handled en masse, which method comprises;
   winding a refractory metal wire on a mandrel of dissimilar metal and thereby forming a continuous composite stock wire,
   indexing said continuous stock wire to a cutting station and mechanically serving the stock wire thereat into segments of predetermined length,
   subjecting only the cut ends of the stock wire segments to a high-temperature torch in synchronized sequence with the indexing of said stock wire to said cutting station and thereby melting said ends in situ and forming nodules of molten metal thereat which contain an alloy of the metals which comprise said mandrel and refractory wire winding and are integral with and located at the respective ends of said wire winding,
   cooling said nodules of molten metal until they solidify, and then
   chemically removing the unmelted portions of the mandrels from said segments of stock wire so that the ends of the resulting hollow wire coils are terminated by said integral nodules of fused alloy-containing metal.

2. The method of claim 1 wherein the in situ melting of the cut ends of said segments of stock wire is achieved by directing a sharply-defined flame from an oxygen-hydrogen torch onto each of said ends.

3. The method of claim 1 wherein
   said refractory metal wire is composed of tungsten,
   said mandrel is composed of iron, and
   the unmelted portions of the iron mandrel in said segments of stock wire are chemically removed by immersing the segments in hydrochloric acid after the nodules have been formed and solidified.

4. The method of claim 1 wherein the nodules of molten metal are cooled and solidified by contacting the molten metal with a liquid immediately after the nodule-forming operation has been completed.

5. The method of claim 1 wherein;
   said stock wire is mechanically severed into segments of substantially the same length at said cutting station, and
   said stock wire segments are arranged in side-by-side relationship and conveyed along an arcuate path past a pair of spaced stationary torches having flames that impinge upon only the cut ends of the segments as the respective segments are moved past said torches.

6. The method of claim 5 wherein;
   said segments of stock wire are arranged in spaced side-by-side relationship with their cut ends aligned one with the other,
   said stock wire segments are conveyed along a circular path that is so oriented relative to said pair of torches that a predetermined portion at each end of the respective stock wire segments is melted by the respective torches and thus forms a nodule of predetermined size, and
   said nodules are cooled and solidified by dropping the hot stock wire segments into a liquid.

7. Apparatus for manufacturing individual embryonic filament-coil components having noduled ends from a continuous stock wire that has been previously formed by winding a refractory metal wire around a mandrel of dissimilar metal, which apparatus comprises;

means for holding and indexing the continuous stock wire relative to a cutting station and a conveying means so that the free end of said stock wire is fed into the conveying means and a predetermined portion of the stock wire is disposed at said cutting station, means at said cutting station for mechanically severing the portions of the stock wire that are sequentially positioned at the cutting station by said holding-indexing means, means for actuating said mechanical-severing means and said conveying means in synchronized sequence with the operation of said wire holding-indexing means so that an end segment of predetermined length is severed from the stock wire and is then carried by said conveying means along a predetermined path away from the newly-formed end of the continuous stock wire, and a pair of spaced stationary torches disposed on opposite sides of the path along which severed segments of stock wire are carried by said conveying means, said torches being so oriented relative to said path that the flames from said torches impinge upon and melt the cut ends of said segments thereby forming nodules of molten metal thereat.

8. The apparatus of claim 7 wherein said conveying means comprises;

a rotatable carrier that has an arcuate periphery with a series of spaced recesses therein adapted to nestingly accommodate one of said stock wire segments, and means for indexing said carrier in synchronism with said wire holding-indexing means and said mechanical-severing means so that one of said recesses is aligned with and receives the free end of the continuous stock wire when the latter is advanced by said holding-indexing means.

9. The apparatus of claim 8 wherein said mechanical-severing means comprises a stationary cutting blade, a pivotally-mounted nozzle through which the stock wire passes, and means for moving the tip of said nozzle toward and away from said cutting blade so that the portion of the stock wire which is located at the top of said nozzle is forced into severing relationship with said stationary blade by said nozzle.

10. The apparatus of claim 8 wherein;

said carrier comprises a circular drum and said recesses comprise a series of parallel-spaced notches in the periphery of said drum, and a stationary guide means is disposed on the side of said drum opposite from said wire holding-indexing means and is arranged to engage the ends of the segments of said stock wire deposited into the respective notches in said drum and maintain said segments in aligned relationship as said drum is rotatively indexed.

11. The apparatus of claim 10 wherein;

said guide means comprises a plate-like member that is spaced a predetermined distance from said drum and extends upwardly from the bottom of said drum, and a stationary band-like member is disposed in overlying relationship with the periphery of said drum and arranged to retain the segments of stock wire in their respective notches as said drum is rotated.

12. The apparatus of claim 10 wherein;

said drum has a width dimension that is smaller than the length of said stock wire segments, said guide means is spaced from said drum a distance such that substantially equal portions of the respective stock wire segments protrude beyond each side of said drum when said stock wire segments are aligned by said guide means, and a pair of stationary torches are disposed adjacent and on opposite sides of the periphery of said drum with their nozzles directed toward and in line with the protruding end portions of the stock wire segments being conveyed by said drum.

13. The apparatus of claim 12 wherein a stationary segment-retaining means is disposed in overlying sliding relationship with the periphery of said drum and extends around only a predetermined portion of the circumference of said drum such that stock wire segments being conveyed by said drum are free to fall out of said drum after the latter has been indexed through approximately one revolution.

\* \* \* \* \*